Patented Jan. 28, 1930

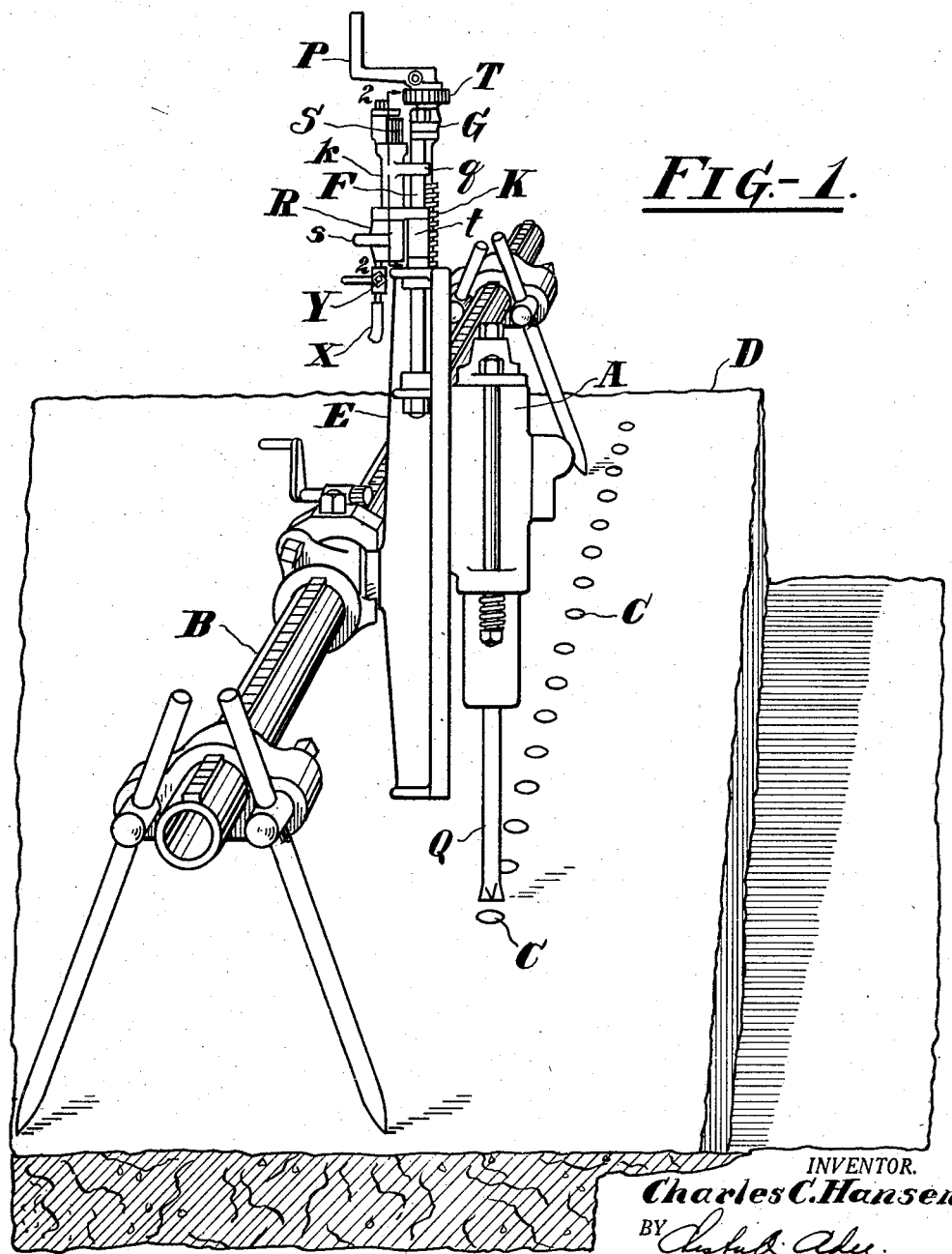

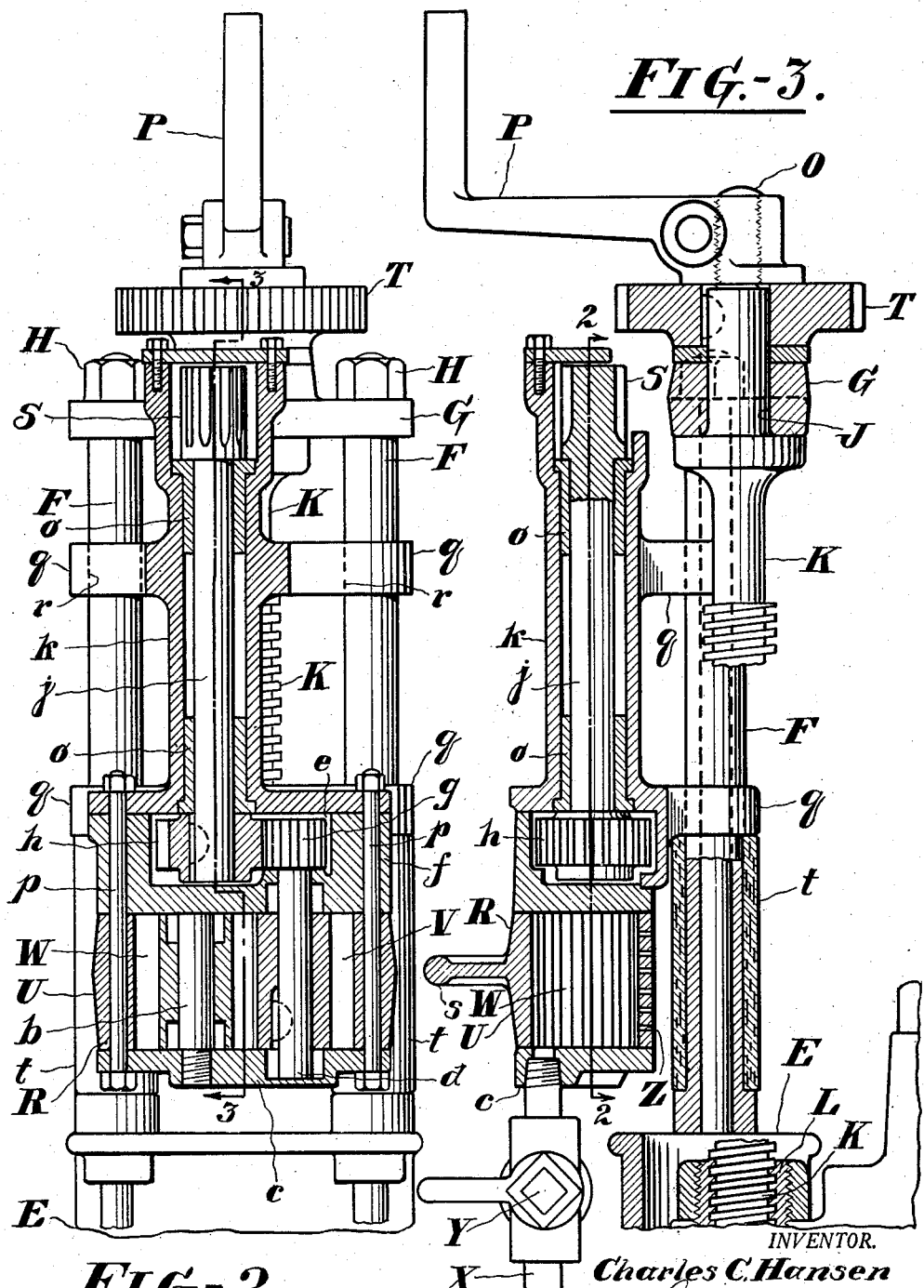

1,744,964

UNITED STATES PATENT OFFICE

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY

RETRACTING DEVICE FOR ROCK DRILLS

Application filed March 3, 1928. Serial No. 258,945.

This invention relates to rock drills, but more particularly to a retracting device for fluid actuated rock drills of the drifter type.

One object of the invention is to expedite the withdrawal of the drill from the work.

Other objects will be in part obvious and in part pointed out hereinafter.

In the drawings accompanying the specification and in which similar reference characters refer to similar parts, Figure 1 is a perspective view of a rock drill mounted on a quarry bar and having the invention applied thereto, Figure 2 is an enlarged sectional plan view of the motor taken through Figure 3 on the line 2—2 looking in the direction indicated by the arrows, and Figure 3 is a sectional elevation taken through Figure 2 on the line 3—3 looking in the direction indicated by the arrows.

Referring more particularly to the drawings, and at first to Figure 1, A designates a rock drill of the drifter type mounted on a quarry bar B with respect to which it is longitudinally movable for drilling holes C in the rock D.

The rock drill A is supported by a shell E which is clamped to the quarry bar B and has a pair of standards F which extend rearwardly of the shell E to form a support for a cross head G. The cross head G may be clamped on the standards in any suitable manner. In the present instance, nuts H are threaded on the ends of the standards F for this purpose.

Formed in the cross head G is an aperture J to receive the end of a feed screw K which may be anchored in the front end of the shell E in a well known manner and is in threaded engagement with a feed nut L carried by the rock drill A for actuating said rock drill londitudinally of the shell.

As is customary in devices of this character, the rearward end of the feed screw K projects rearwardly of the cross head G and has a threaded portion O on which is disposed a crank P whereby the feed screw may be manually rotated.

Usually in feeding mechanism of the type disclosed, the crank P is used for rotating the feed screw K both for advancing the rock drill A toward the work and for retracting it therefrom after the working implement Q has penetrated the rock to the full extent of its length or for the distance which the roll drill A is capable of travelling in the shell E. While the hole C is being drilled, the speed at which the rock drill A moves relatively to the shell E is of course dependent on the rate of speed at which the working implement Q penetrates the rock. During this operation the feed screw K may readily be rotated by hand since the speed at which the rock drill A is capable of advancing is comparatively slow. After the working implement Q has penetrated the rock D to its full extent and it is desired to retract the rock drill D from the work to change the working implement for the purpose of extending the hole C to a greater depth, such manual rotation of the feed screw K is necessarily slow and consumes a considerable amount of time which, when the equipment is used for drilling a series of closely spaced holes as indicated in Figure 1, greatly reduces the efficiency of the drilling apparatus.

In order to expedite the withdrawal of the drill from the drill hole, a motor R is mounted on the standards F to rotate the feed screw in a reverse direction. The motor has a pinion S adapted to engage a gear T keyed to the feed screw K, preferably at a point between the cross head G and the crank P.

The motor comprises a cylinder U in which are disposed a pair of intermeshing gears V and W adapted to be actuated by pressure fluid conveyed into the cylinder U by a connection X. A throttle valve Y is interposed in the connection X to control the admission of pressure fluid into the cylinder U and the exhaust of pressure fluid from the motor R is effected through a plurality of exhaust ports Z in the cylinder U.

In the construction shown, the gear W is mounted rotatably on a shaft $b$ threaded at one end into a cover $c$ forming a closure for one end of the cylinder U. The gear V is keyed to a shaft $d$ which extends into a recess $e$ in a plate $f$ located at the opposite end of the cylinder U and carries a pinion

*g* which meshes with a gear *h* mounted on a shaft *j* wherewith the pinion S is integrally formed.

Seated on the rearward end near the plate *f* is a casing *k* which encircles the shaft *j* and forms a seat for bushings *o* which act as bearings for the shaft *j*. The parts comprising the casing of the motor R may be clamped securely together in any suitable manner. In the present instance tie rods or bolts *p* are utilized for this purpose.

The casing *k* is provided with a plurality of arms *q* which extend on opposite sides thereof and have apertures *r* to slidably receive the standards F whereon the motor is mounted. Preferably a grip *s* is formed on the motor in any convenient location, as for instance on the cylinder U, for manually sliding the motor on the standards F.

In order to protect the motor and associated parts against injury due to impact of the motor against the shell E, rubber buffers *t* are disposed on the standards F to act as a yieldable seat for the arms *q*.

In practice, while the holes C are being drilled, the feed screw K may be rotated by means of the crank *p* to advance the drilling mechanism toward the work. After the working implement Q has been driven into the rock and it is desired to retract the drill for the purpose of changing working implements, the motor R may be moved rearwardly on the standards F to bring the pinions S into mesh with the gear T. If then the motor R be set in operation, its rotary movement will be transmitted through the elements connecting said motor with the pinion S to the gear T, thus rotating the feed screw K in the reverse direction. This movement of the feed screw K which may be induced at a speed greatly in excess of that which can be attained by hand operation will quickly withdraw the drilling mechanism to a point where a longer working implement may be substituted for that used in the previous operation.

After the drilling mechanism has been moved rearwardly on the shell for the required distance, the motor R may be released. Due to the position in which drills of the type to which the invention is applied are usually used, that is, in the vertical position or in positions approaching the vertical, the motor R will drop forwardly of its own weight against the buffers *t*. The motor may then remain in that position until it is again desired to retract the drill.

I claim:

1. In a retracting device for rock drills, the combination of a rock drill and a shell, a manually rotatable feed screw for actuating the rock drill toward the work, and a motor for rotating the feed screw to retract the drill from the work, said motor being bodily movable into and out of engagement with the feed screw.

2. In a retracting device for rock drills, the combination of a rock drill and a shell, a manually rotatable feed screw for actuating the drill toward the work, and a motor supported by the shell for rotating the feed screw to retract the drill from the work, said motor being bodily movable to operatively connect it with the feed screw.

3. In a retracting device for rock drills, the combination of a rock drill and a shell, a manually rotatable feed screw for actuating the drill toward the work, means supported by the shell including a pair of standards and a cross head for supporting one end of the feed screw, and a motor supported by the standards for rotating the feed screw to retract the drill from the work, said motor being movable on the standards to connect and disconnect it to and from the feed screw.

4. In a retracting device for rock drills, the combination of a rock drill and a shell, a manually rotatable feed screw for actuating the drill toward the work, means supported by the shell including a pair of standards and a cross head for supporting one end of the feed screw, and a motor slidable on the standards adapted to be moved into engagement with the feed screw for rotating said feed screw in a reverse direction to retract the drill from the work.

5. In a retracting device for rock drills, the combination of a rock drill and a shell, a manually rotatable feed screw for actuating the drill toward the work, a gear on the feed screw, means including a pair of standards and a cross head for supporting one end of the feed screw, a motor slidable on the standards for rotating the feed screw in reverse direction to retract the drill from the work, and a pinion on the motor to intermesh with the gear.

6. In a retracting device for rock drills, the combination of a rock drill and a shell, a manually rotatable feed screw in the shell for actuating the drill toward the work, a gear on the feed screw, means including a pair of standards and a cross head for supporting one end of the feed screw, a fluid actuated motor slidable on the standards, a pinion on the motor, and a grip portion on the motor to slidably actuate the motor on the standards for meshing the pinion with the gear.

7. In a retracting device for rock drills, the combination of a rock drill and a shell, a manually rotatable feed screw for actuating the drill toward the work, a gear on the feed screw, means including a pair of standards and a cross head for supporting one end of the feed screw, a fluid actuated motor, arms on the motor having apertures to slidably receive the standards, a pinion on the motor, a grip portion on the motor for slidably actuating said motor on the standards to move the pinion into engagement with the gear, and flexible means on the standards forming a yieldable seat for the motor.

In testimony whereof I have signed this specification.

CHARLES C. HANSEN.